United States Patent

[11] 3,532,041

| [72] | Inventor | Claus Prochnow<br>Braunschweig, Germany |
|---|---|---|
| [21] | Appl. No. | 762,674 |
| [22] | Filed | Sept. 23, 1968 |
| [45] | Patented | Oct. 6, 1970 |
| [73] | Assignee | Rollei-Werke Franke & Heidecke<br>Braunschweig, Germany,<br>a firm of Germany |
| [32] | Priority | Sept. 23, 1967 |
| [33] | | Germany |
| [31] | | No. 1,274,440 |

[54] PHOTOGRAPHIC CAMERA
9 Claims, 6 Drawing Figs.

[52] U.S. Cl. .................................................. 95/31, 95/34, 95/71
[51] Int. Cl. ............................................. G03b 19/04
[50] Field of Search .............................. 95/31, 34, 71, 19, 66

[56] References Cited
UNITED STATES PATENTS

| 484,569 | 10/1892 | Pierce | 95/71 |
| 2,462,683 | 2/1949 | Schwartz | 95/71 |
| 2,674,166 | 4/1954 | Sochar | 95/34 |
| 2,716,929 | 9/1955 | Smith | 95/31X |
| 3,223,011 | 12/1965 | Hunt | 95/34 |

*Primary Examiner*—John M. Horan
*Assistant Examiner*—David S. Stallard
*Attorney*—Charles Shepard and Stonebraker and Shepard ABSTRACT: A roll film camera of the type in which the film is contained in a cassette or magazine detachable from the rear of the camera body. An opaque slide is inserted in a guideway in the cassette prior to removal of the cassette from the camera body, so the film in the cassette will not be fogged when the cassette is removed. The shutter of the camera requires to be cocked or tensioned before an exposure is made. Interengaging parts on the cassette and the camera body are so arranged that the cassette cannot be attached to the camera body unless the shutter parts are in cocked position, and when the cassette is properly positioned on the body, the shutter cannot be released or tripped unless the slide has been withdrawn from the cassette, so that the exposure light beam may reach the film.

Patented Oct. 6, 1970

3,532,041

3,532,041

PHOTOGRAPHIC CAMERA

BACKGROUND OF THE INVENTION

Cameras with detachable cassettes or magazines for holding the film are known in the art. In many of the prior constructions, visible signals or indicators are necessary to show the operator the position or condition of various parts of the mechanism, and failure to observe carefully the various indicators may result in faulty operation. For example, after properly attaching the cassette to the camera body, the operator may neglect to remove the slide which has protected the film from fogging while the cassette was detached from the body, and then when the shutter is operated, light cannot reach the film so that a blank or wasted frame of film will result, to say nothing of the disappointment of not getting the desired picture. Also, with some of the prior constructions, the operator may attach the cassette to the camera body and remove the protecting slide, but may not notice that the shutter is not cocked or tensioned ready for an exposure.

It is an object of the present invention to provide a generally improved and more satisfactory camera of the roll film type in which the film is contained in a detachable cassette and in which the shutter must be cocked or tensioned before an exposure is made.

More specifically, it is another object of the invention to provide an improved camera of this kind, having simple and effective means for preventing attachment of the cassette to the camera body except when the shutter mechanism is in its cocked condition, ready for making an exposure.

Still another object is the provision of a camera having means for preventing actuation of the shutter release or trip when a cassette has been positioned on the camera body, unless the protecting slide of the cassette has first been removed.

A further object is the provision of a camera of this general type, in which faulty operation of the shutter with respect to the cassette is prevented by cooperating interengaging parts discernible to the operator by the sense of touch or feel, without requiring visual observation of any signal or indicator, thus enabling elimination of the visible signals which have been required in many of the prior art cameras in order to minimize such faulty operation.

BRIEF DESCRIPTION OF THE DRAWINGS

In the accompanying drawings, which are incorporated herein by reference and constitute a material part of the disclosure, and which illustrate a preferred embodiment of the invention by way of example.

DESCRIPTION OF THE PREFERRED EMBODIMENT

The present invention is useful with various known kinds of cameras which have detachable film cassettes. The details of the camera body and of the cassette, except for the cooperating parts here illustrated, may be of any conventional form known in the art, and are not here illustrated. As one example, the present invention may be used with a camera of the kind shown in the copending application of the present applicant and another, Ser. No. 667,030, filed Aug. 25, 1967, in which see particularly FIG. 4 of the drawings, illustrating some features of a camera body and a detachable cassette suitable for purposes of the present invention.

Figure 1:
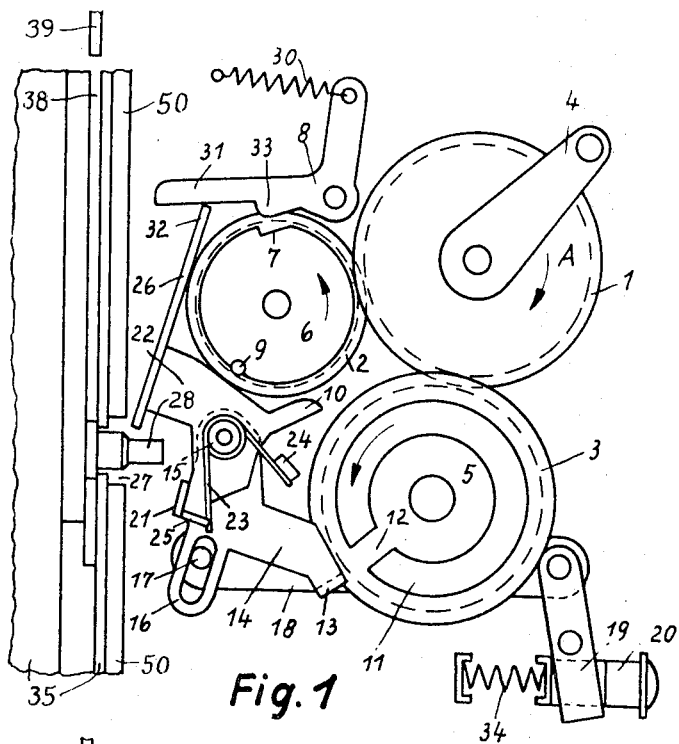
FIG. 1 is a schematic view of a fragment of the camera body and associated fragment of the cassette, showing part of the film winding and shutter cocking mechanism of the camera and associated parts of the camera and the cassette which cooperate with each other to prevent faulty operation, the parts being shown in cocked or tensioned position ready for an exposure.

Referring now to FIG. 1 of the present drawings, a fragment of the rear wall of the camera body is shown at 50, and a fragment of the cassette at 35. The camera body is equipped with a shutter of conventional form (not shown), conveniently but not necessarily a shutter of the so-called focal plane type, also known as a curtain shutter or a roller-blind shutter. As customary, the shutter has to be cocked or tensioned in advance of each exposure, and also as customary, the shutter cocking mechanism is operatively connected to the film transport mechanism so that a predetermined motion of a single operating member will serve both to tension the shutter and to advance the film through the space of one frame.

For example, the gear 1, turned in the direction of the arrow A by the manual crank 4, serves to drive a gear 2 and a gear 3. The parts are so proportioned that a single movement of the handcrank 4 to the normal extent determined by a stop, serves to turn the gear 2 through exactly one full revolution, and to turn the gear 3 through somewhat less than a full revolution. The gear 2 is connected, through mechanism well known in the art and not here illustrated, with the film-feeding mechanism in the cassette, so as to advance the film from one frame to the next. The gear 3 is connected to the shutter cocking or tensioning mechanism of conventional kind, including for example the tensioning roller 5 on which part of the shutter curtain is wound up during the tensioning operation, if the shutter is of the curtain or roller-blind type, the connection from the gear 3 to the roller 5 being through the usual releasable pawl not here shown. In the conventional manner, the release of the pawl enables the roller 5 to perform its running down movement to make an exposure in the known manner.

The gear 2 is connected to a cam disk 6 to turn therewith, the disk having a cam notch 7 interacting with a protuberance 33 on a cam lever 8. The disk 6 also carries a deflector pin 9 which acts on the tail 10 of a lever 22 further described below.

The rotary member 5 of the shutter tensioning mechanism carries a ring 11 provided at one point with a radial groove 12. When the rotary member 5 is in a position corresponding to the tensioned or cocked position of the shutter, this radial groove 12 is opposite an ear 13 of a lever 14 pivoted at 15, so that the ear 13 can drop into the groove 12 when the lever turns counterclockwise on its pivot. In all other positions of the rotary member 5 and ring 11 (that is, when the shutter is in any condition other than a fully tensioned condition) the ring prevents the lever 14 from turning counterclockwise, except to a limited and ineffective initial amount.

Figure 2:
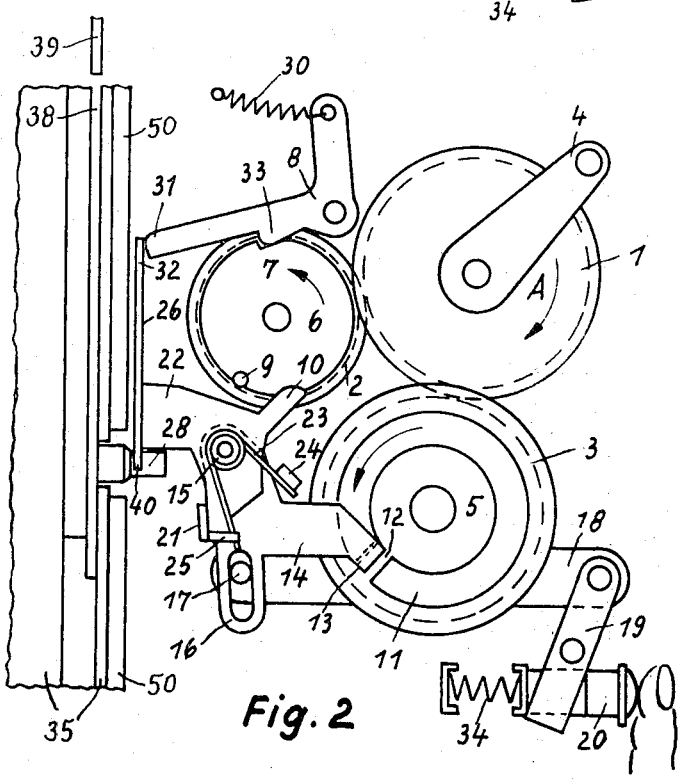
FIG. 2 is a similar view with the parts being released for making an exposure.

The lever 14 is connected to the shutter release button or trip member 20 by means of a slot 16 on the lever 14, engaging a pin 17 on a link 18 connected by a lever 19 to the trip button 20, which is constantly urged in an outward direction by the spring 34. Pressing the button 20 inwardly to release the shutter for making an exposure will turn the lever 14 in a counterclockwise direction if the groove 12 is opposite the lug or ear 13 of the lever 14. This inward movement of the button 20 will release the shutter for an exposure, through conventional mechanism the details of which are unimportant for purposes of the present invention and are not here shown. The inwardly pressed position of the button 20 is shown in FIG. 2. If the groove 12 is not opposite the ear 13, the button 20 cannot be pressed inwardly through its normal range.

The lever 14 also carries an upstanding lug or ear 21 which interacts with a second three-armed lever 22 pivoted on the same pivot pin 15. The lever 22 is urged in a clockwise direction by a hairpin spring 23 which reacts at one end against the fixed pin 24 and at the other end against an upstanding lug 25 on the lever 22. This spring action causes the edge of the ear 25 to lie normally against the ear 21 on the lever 14, so that when the button 20 is depressed to swing the lever 14 counterclockwise, the lug 21 thereof carries the lever 22 counterclockwise with the lever 14.

Fixed to the lever 22 is a plate 26 (see also FIGS. 3 and 4) having a lower end 40 which cooperates with a pin 28 mounted on a feeler member 29 in the cassette 35, this pin 28 projecting forwardly into the camera body through an opening 27 in the wall 50 of the camera body, when the cassette is properly mounted on the camera body. The action of this pin 28 with respect to the lower end 40 of the plate 26 will be further described below.

The previously mentioned lever 8, carrying the protuberance 33 which cooperates with the cam notch 7 in the disk 6, is urged by a spring 30 in a counterclockwise direction on its pivot. The end 31 of the lever 8 rests on the upper end 32 of the plate 26 when the parts are in the position shown in FIG. 1, and rests against the front surface of the upper end 32 of the plate when the parts are in the position shown in FIG. 2, holding or latching the plate 26 in this position. This latched condition of the parts can occur only when the protuberance 33 on the lever 8 is in the cam notch 7 of the disk 6.

The previously mentioned feeler lever 29 in the cassette, which carries the pin 28, is pivoted in the cassette at 36 and has a nose or protuberance 37 which projects into the groove or guideway 38 of the protective slide 39. When the slide 39 is in its protective position in the guideway 38, as shown in FIG. 4, the edge of the slide displaces the protuberance 37 to the left, thereby swinging the lever 29 to the left and swinging the pin 28 to the position shown in FIG. 4. When the protective slide 39 is withdrawn from the cassette, so that exposures on the film can be made, the protuberance 37 is no longer displaced by the slide 39 and so the feeler lever 29 swings to the right (under the influence of a light spring, not shown) moving the pin 28 rightwardly to the position shown in FIG. 3, where it does not obstruct the motion of the plate 26 in the camera body.

Figure 3:
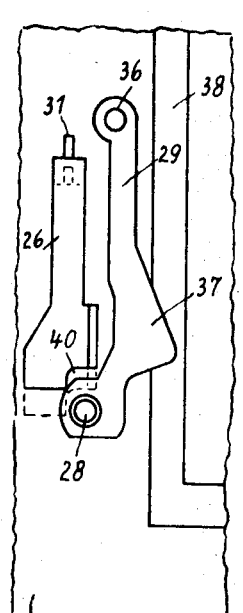
FIG. 3 is a face view of a fragment of the end of the cassette which is adapted to be placed against the camera body, with the protecting slide withdrawn so that an exposure may be made.
Figure 4:
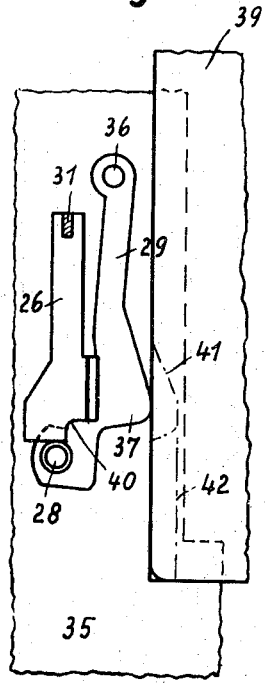
FIG. 4 is a similar view with the protecting slide in light-obstructing position and with a feeler member displaced by the slide so as to prevent the making of an exposure.

Assuming now that the shutter mechanism is cocked and that the cassette is properly positioned on the camera body and the protective slide 39 is withdrawn, the parts will be in the positions shown in FIGS. 1 and 3. When an exposure is to be made, the operator depresses the release button 20, which draws rightwardly on the link 18 and moves the lever 14 counterclockwise on its pivot 15, from the position shown in FIG. 1 to the position shown in FIG. 2, this movement being possible at this time because the groove 12 is opposite the ear 13 on the lever 14. This counterclockwise movement of the lever 14, acting through the ear 21 thereof, moves the lever 22 correspondingly counterclockwise with it, bringing the plate 26 down from the position shown in FIG. 1 to the position shown in FIG. 2, where it becomes latched by the end 31 of the lever 8 engaging in front of the upper end 32 of the plate 26, as shown. This downward movement of the plate 26 at this time is possible because the slide 39 is withdrawn and therefore the pin 28 is in its rightward position shown in FIG. 3 rather than its leftward position shown in FIG. 4, and does not obstruct the downward movement of the lower end of the plate 26. When the operator releases the inward pressure on the button 20, the spring 34 restores the button in an outward direction, moving the lever 14 back from the position shown in FIG. 2 to the position shown in FIG. 1 where the ear 13 is out of the groove 12, but the lever 22 remains in the position shown in FIG. 2 because of the latching action of the end 31 of the lever 8. The outward movement of the button 20 serves (through conventional mechanism not here shown) to release the shutter mechanism so that the rotary member 5 makes its running down movement to open and close the shutter and produce the exposure, and at the end of the running down movement the rotary member 5 comes to rest in a different position in which the groove 12 is no longer opposite the ear 13, so another inward pressing movement of the button 20 is not possible until the shutter mechanism has been cocked.

With the parts in this position just described (the exposure having been made, but the shutter not yet cocked or tensioned again) the plate 26 lies in the position shown in broken lines in FIG. 3, the pin 28 being received in a notch 40 in the lower end of the plate 26, and the lower end of the plate lies to the left of the pin 28 so that the pin cannot move leftwardly.

Suppose the operator now wishes to insert the protective slide 39 in the cassette and remove the cassette from the camera. He cannot do so at this time, because the slide 39 cannot be inserted to its proper position without displacing the protuberance 37 leftwardly and swinging the feeler lever 29 and pin 28 leftwardly, and this cannot be done because leftward movement of the pin 28 is prevented by the lower end of the plate 26 in the camera body. Therefore, when attempting to insert the protective slide 39 and finding that it will not move all the way to its normal protective position, the operator is immediately made conscious of the fact that he cannot remove the cassette because he has not yet cocked or tensioned the shutter mechanism, which is intended to be a necessary prelude to removal of the cassette. Therefore, he operates the crank 4 in the direction of the arrow A, and this turns the gear 3 through somewhat less than a revolution, tensioning the shutter, and simultaneously turns the gear 2 through exactly one complete revolution. The first part of this revolution of the gear 2 and associated cam disk 6 cams the protuberance 33 out of the cam notch 7, raising the end 31 of the lever 8 so as to unlatch the upper end 32 of the plate 26. The action of the spring 23, assisted by the action of the pin 9 on the tail 10 of the lever 22, then moves the plate 26 back from the position shown in FIG. 2 to the position shown in FIG. 1, raising the lower end of the plate up above the pin 28 of the cassette. The plate no longer obstructs the leftward movement of the pin 28; therefore the protective slide 39 can be fully inserted in the guideway 38 of the cassette, and the cassette can be safely removed from the camera.

So long as the shutter mechanism remains in its tensioned or cocked position, the cassette (or another duplicate cassette) can be attached to the camera, since the plate is in its upper position and does not obstruct the movement of the pin 28 on the cassette through the opening 27 in the wall 50 of the camera body. However, if meanwhile (while the cassette was removed from the camera body) the shutter has been operated either purposely or accidentally, and has not been cocked again, the plate 26 will be in the lower position shown in FIG. 2, and the lower end of the plate will lie in the path of the pin 28 when the operator attempts to attach the cassette to the camera body. Therefore the operator will be warned that the camera body is not in proper condition for attaching the cassette, and he must cock or tension the shutter mechanism, after which the cassette can be attached in proper position on the body.

Suppose that, after attaching the cassette, the operator attempts to make an exposure without removing the protective slide 39. This cannot be done, because the inward movement of the release button 20 will necessarily bring the plate 26 down from the position shown in FIG. 1 to the position shown in FIG. 2, before the shutter is released. This downward movement cannot occur, because while the protective slide 39 is in place in the cassette, the pin 28 is displaced to the leftward position shown in FIG. 4, underlying the lower end of the plate 26 and preventing the plate from completing its downward movement. Therefore the inward movement of the release button cannot occur (except to a limited preliminary extent) and the operator is warned by the sense of touch that something is wrong. He must remove the slide 39, whereupon the pin 28 swings to the right (to the position shown in FIG. 3) and then the button 20 can make its full movement and an exposure can be made.

Figure 5:
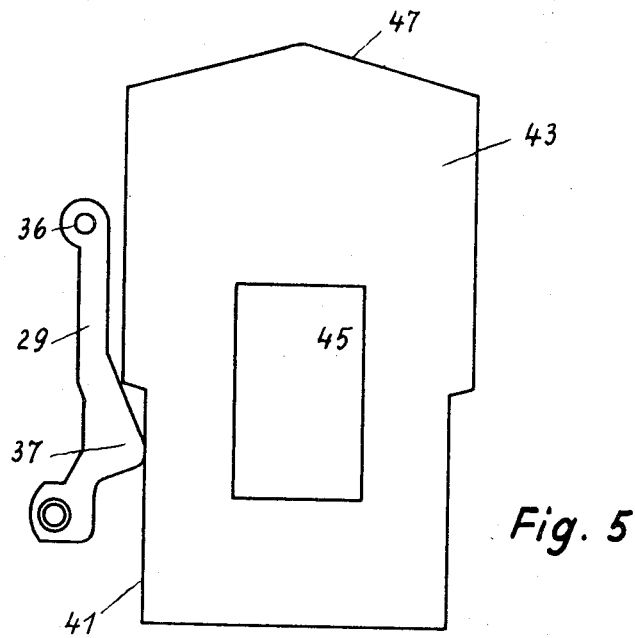
FIG. 5 is a view of one form of masking slide for use in reducing the size of the picture area, showing the cooperation of the edge of the slide with the feeler member.
Figure 6:
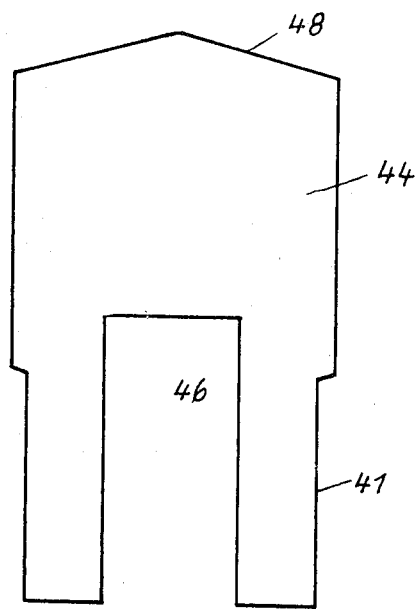
FIG. 6 is a face view of another form of masking slide for reducing the size of the picture area.

Sometimes it is desired to use a size-limiting mask in the guideway 38, to cut down the size of the exposure area on the film. One form of such a mask is shown at 43 in FIG. 5; another form is shown at 44 in FIG. 6. When such a mask is used, of course it must be possible to make an exposure, and the edge of a mask of this kind should not operate on the feeler lever 29 to prevent the making of an exposure, as does the edge of the protective mask 39. Therefore, the lower portions of the size-limiting masks such as 43 and 44 are cut away at one or both edges, as indicated at 41 in both FIGS. 5 and 6, in order that when these masks are inserted, the edges thereof will not act on the protuberance 37 of the feeler lever 29, and will not cause the pin 28 to move to a position preventing the making of an exposure. The exposure aperture in the mask 43 is indicated at 45, and the exposure aperture in the mask 44 is indicated at 46.

In order that the difference between these size-limiting masks 43 and 44 and the regular protective mask 39 may be readily apparent to the operator, so that he will not mistake the size-limiting mask for the protective mask, the projecting end or grasping end of each size-limiting mask is preferably made of a conspicuously different shape from the projecting end or grasping end of the main protective mask 39. For example, the masks 43 and 44 may have pointed grasping ends as shown at 47 and 48 in FIGS. 5 and 6.

Other protective mechanism, constituting a separate invention and not part of the present invention, may be provided for insuring that the cassette cannot be removed from the camera body until the protective mask 39 has been properly inserted in the cassette to protect the film therein against fogging.

It is to be understood that the disclosure is given by way of illustrative example only, rather than by way of limitation, and that without departing from the invention, the details may be varied within the scope of the appended claims.

I claim:

1. A roll film camera comprising a camera body including shutter mechanism having a tensioned position and a rundown position and releasable for movement from tensioned position to rundown position to make an exposure, a film cassette adapted to be detachably mounted on said body, said cassette including a slide guideway and a protective slide insertable into said guideway to protect film in the cassette from fogging when the cassette is removed from said body, said slide being removable from said guideway to enable making an exposure on said film while the cassette is mounted on said body, characterized by means including cooperating parts carried by said cassette and said body respectively for preventing insertion of said protective slide into said guideway of a cassette mounted on the body except when said shutter mechanism is in its tensioned position.

2. A construction as defined in claim 1, further characterized by the fact that said means also prevents mounting a cassette on the body, with a protective slide in the guideway of the cassette, except when said shutter mechanism is in its tensioned position.

3. A construction as defined in claim 1, further characterized by the fact that said means also prevents release of said shutter mechanism to make an exposure except when said slide of a cassette mounted on the body is removed from its guideway.

4. A construction as defined in claim 1, wherein said cooperating parts include a movable feeler member mounted on said cassette and extending into said slide guideway and having a first position when a protective slide is in said guideway and a second position when no protective slide is in said guideway, said feeler member having a correspondingly movable part projecting into said camera body when the cassette is mounted on the body, and a shutter mechanism part mounted on said camera body and having a first position when said shutter mechanism is tensioned and a second position when said shutter mechanism is not tensioned, said shutter mechanism part when in its second position lying in the path of said projecting part of said feeler member and serving to block entrance of said projecting part into the camera body when said feeler member is in its first position.

5. A construction as defined in claim 4, wherein said projecting part of said feeler member, when said feeler member is in its first position, lies in the path of and blocks movement of said shutter mechanism part from its first position to its second position.

6. A construction as defined in claim 4, wherein said shutter mechanism part, when in its second position, lies in the path of movement of said projecting part of said feeler member and blocks movement thereof from its second position to its first position, thereby preventing insertion of a protective slide into said slide guideway so long as said shutter mechanism part remains in its second position.

7. A construction as defined in claim 4, in which said shutter mechanism includes a release button actuatable to release the shutter mechanism for movement from tensioned position to rundown position, said shutter mechanism part being operatively connected to said button to be moved from first position to second position when said button is actuated, and a latching member for latching said shutter mechanism part in its second position.

8. A construction as defined in claim 7, further including means operated by the act of moving said shutter mechanism from rundown position to tensioned position for unlatching said latching member so that said shutter mechanism part may return from its second position to its first position.

9. A construction as defined in claim 5, further including a size-limiting slide insertable into said slide guideway of said cassette in place of said protective slide, said size-limiting slide having an edge thereof cut away so that the presence of said size-limiting slide in said guideway will not cause said feeler member to be in its first position and thus will not block movement of said shutter mechanism part from its first position to its second position.